Patented Feb. 6, 1951

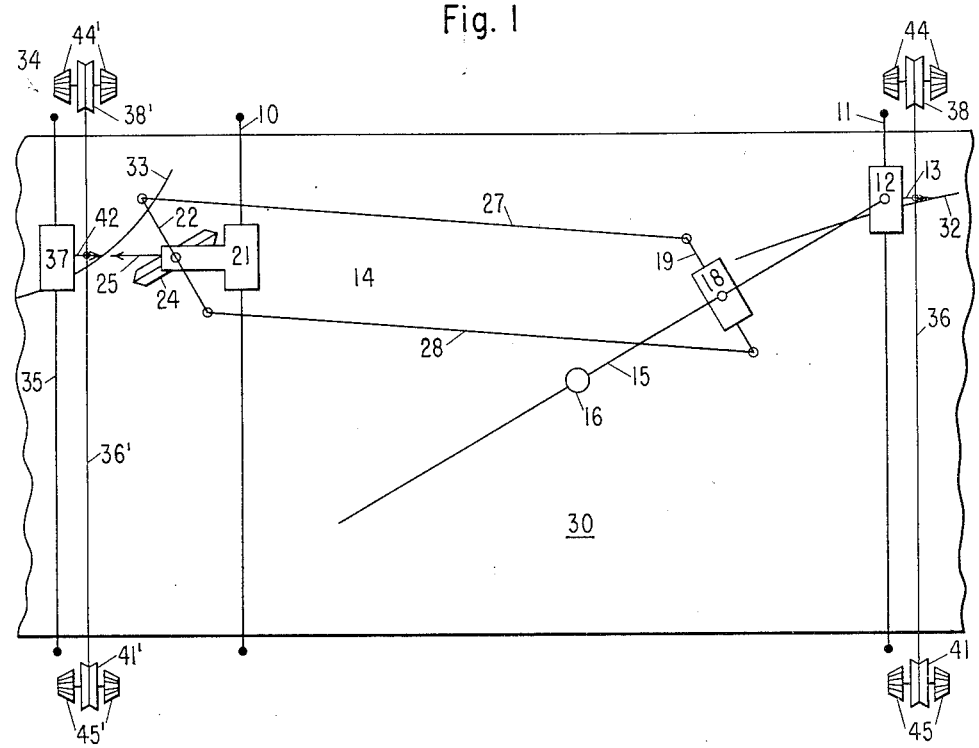
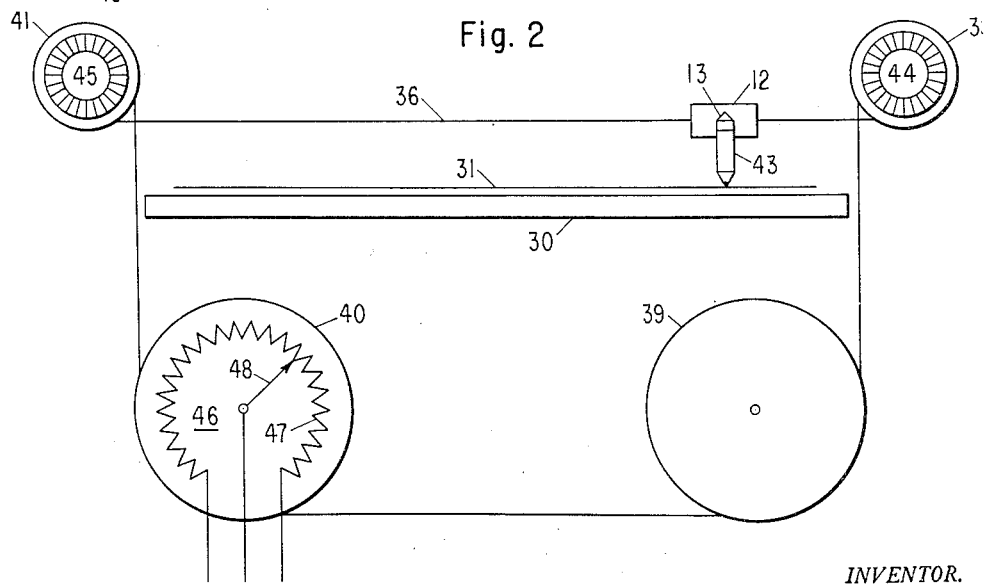

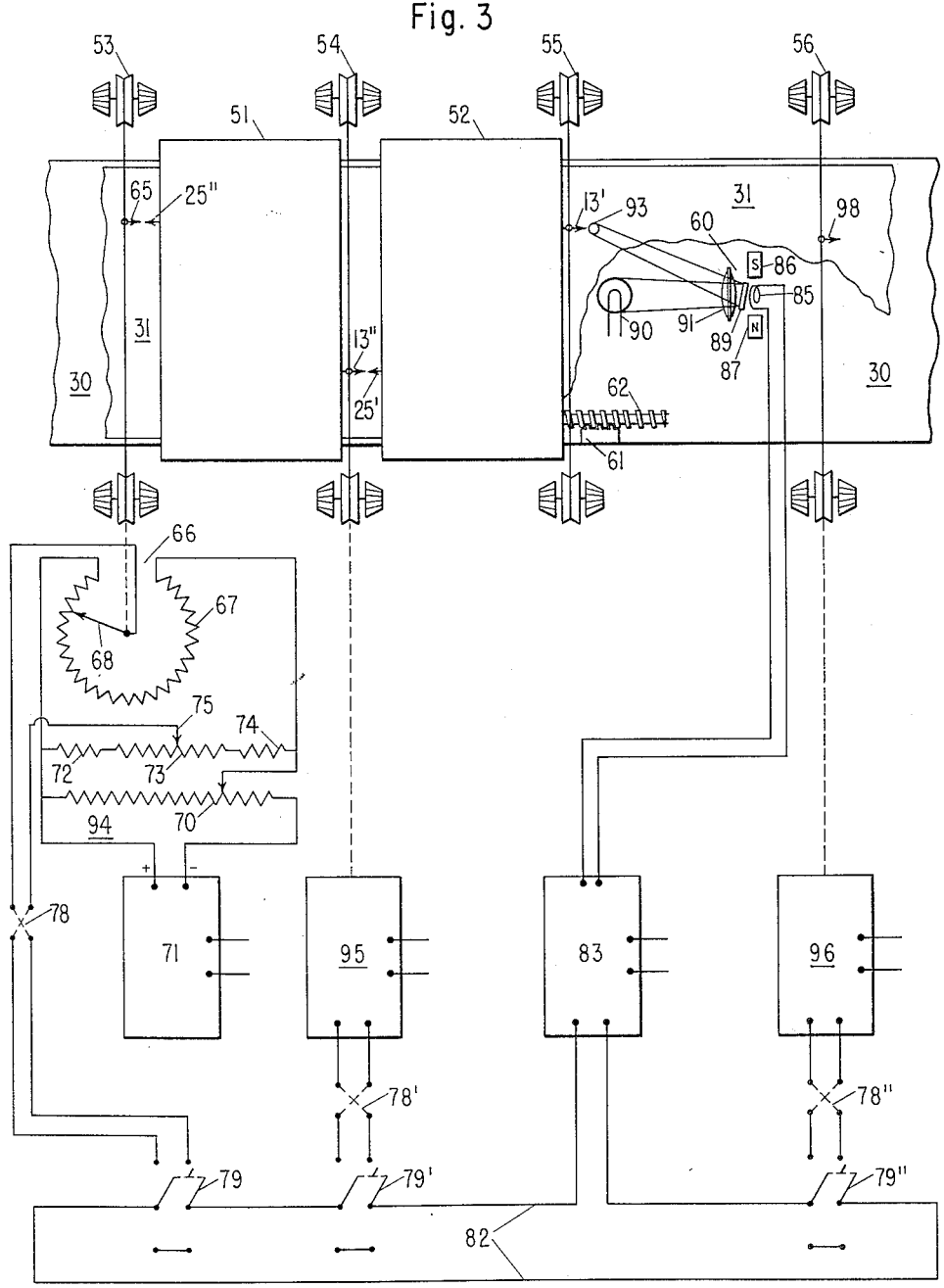

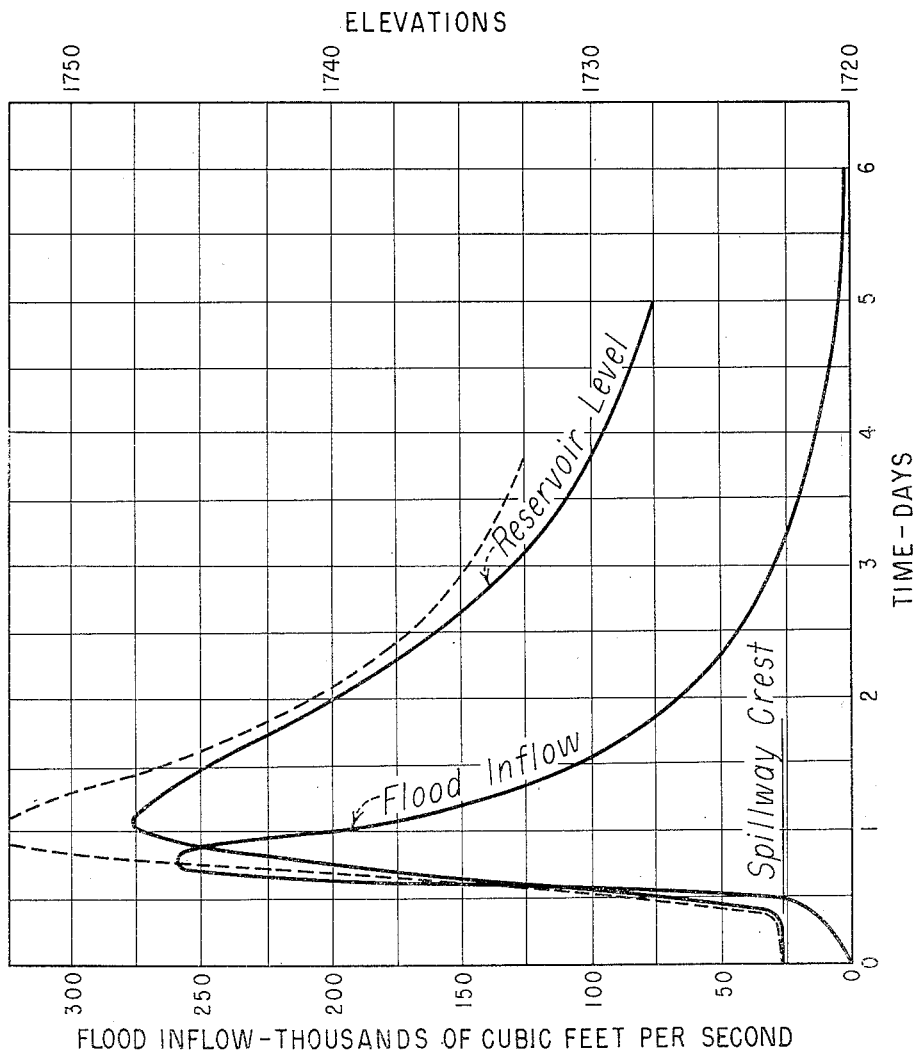

2,540,111

UNITED STATES PATENT OFFICE 2,540,111

REFLEX INTEGRAPH

Robert E. Glover, Denver, Colo.

Application August 4, 1947, Serial No. 766,120

21 Claims. (Cl. 235—61)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (ch. 460, 45 Stat. L. 467).

This invention relates to a reflex integraph, a device for solving differential equations.

A large number of differential equations exist for which there are no solutions in terms of known functions. Solutions of such equations have been sought by mechanical means but the machines used have been large, complicated, expensive, difficult to adapt to a new solution and requiring particular skill on the part of the operating personnel.

It is an object of this invention to provide a mechanical device for solving differential equations, said device being relatively compact, simple of construction, and inexpensive to manufacture.

It is a further object of this invention to provide a mechanical integrating device which may be quickly and easily adapted to solve various types of mathematical problems.

It is also an object to provide a mechanical integrating device which may be operated and adapted to new problems by moderately skilled personnel.

It is also an object to provide a mechanical integrating device which will be free from errors due to lost motion.

Other objects will be apparent from the following description taken in connection with the accompanying drawing in which:

Fig. 1 is a schematic view of an adaptation of the Abakanowicz motion as used in this invention.

Fig. 2 is an elevational view of the follower motion used in this invention.

Fig. 3 is a schematic view of a device embodying the principle of this invention.

Figure 4:
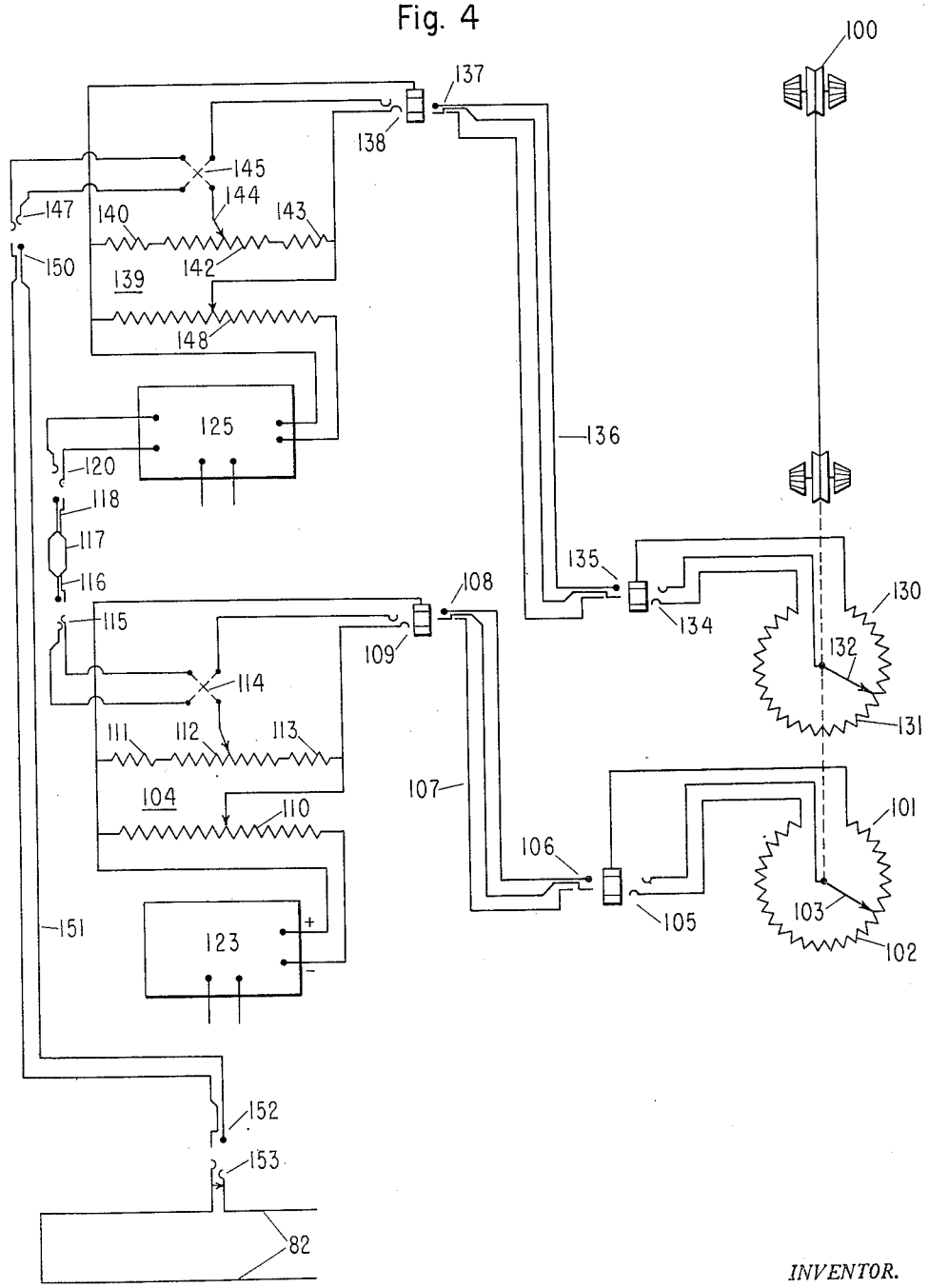
Fig. 4 is a schematic view of the multiplier device used with this invention.

The integrating device used in this invention is the Abakanowicz motion designated generally at 14 in Fig. 1 where it is shown with positioning and following means. In that figure tracks 10 and 11 run transversely of the machine and are fixed thereto. A carriage 12, arranged to run along track 11, is provided with a pointer and has pivoted thereto a bar 15. Bar 15 is arranged to be slidable at all times axially through a fixed pivot 16. Pivot 16 is fixed with respect to the frame of the machine by means not shown. A carriage 18 is arranged to be slidable at all times axially along bar 15. Fixed to carriage 18 perpendicular to bar 15 is crossbar 19.

Carriage 21 is constructed to run transversely along track 10 and has pivoted thereto a crossbar 22. Crossbar 22 has fixed at right angles thereto a sharp-edged disc 24 pivoted for rotation about its axis which is parallel to the crossbar 22. Carriage 21 carries pointer 25. Links 27 and 28 are pivotally connected at the ends thereof to the ends of crossbars 19 and 22. Links 27 and 28 are of equal length as are crossbars 19 and 22. Table 30 moves longitudinally and preferably is covered by a sheet of paper.

The parallelogram formed by crossbars 19 and 22 and links 27 and 28 causes disc 24 to always remain parallel to bar 15. Sharp-edged disc 24 will not slide along its axis of rotation but must always move along a path the tangent to which at every point is the trace of the plane of the disc. If pointer 13 is caused to trace curve 32 on table 30 as table 30 moves longitudinally, pointer 25 will trace curve 33 on table 30, curve 33 being the integral of curve 32. If pointer 25 carries a pencil, curve 33 will be generated on the tracing of curve 32. If $x$ represents a distance measured along the axis in a direction counter to the table motion and $y_1$ and $y_2$ represent the ordinates of the curves 33 and 32, respectively.

$$\frac{dy_1}{dx} = K y_2$$

where K is some constant which depends upon the distance of the fixed pivot from track 11. Then by integration $$y_1 = K \int y_2 \cdot dx$$

Associated with the integrating motion is a positioning device comprising a cable 36 running over wheels 38 and 41, one of said wheels being on each side of table 30. Wheels 38 and 41 are provided with knobs 44 and 45 respectively to allow manual rotation of the wheels and thus manual positioning of the carriage 12. Cable 36 is arranged to pull carriage 12 in either direction transversely of table 30, and is here shown attached to pointer 13 to avoid confusion in the drawing between cable 36 and track 11.

In Fig. 2 is shown an elevational view of the positioning means. Cable 36 passes around 270° of wheels 38 and 41 and around 450° of wheels 39 and 40. Wheels 38 and 41 have respectively fixed thereto knobs 44 and 45. Preferably knobs such as 44 and 45 are affixed on both sides of wheels 38 and 41. These knobs allow convenient positioning of carriage 12 from either side of table 30. In this invention table 30 is preferably transparent and has a translucent paper strip 31 fixed thereto for movement therewith. Pointer 13 carries a pencil 43 to record its trace on paper 31. The cable 36 is kept taut to eliminate errors due to lost motion.

Associated with wheel 40 is a potentiometer 46 comprising resistor 47 and sliding contact 48. Contact 48 is fixed to wheel 40 so that rotation of wheel 40 slides contactor 48 along resistor 47.

Also shown associated with the integrating motion in Fig. 1 is a follower motion designated generally at 34. This follower motion comprises a transverse track 35 fixed to the frame of the machine. Carriage 37 carrying pointer 42 runs along track 35 and is positioned therealong by cable 36' which runs over wheels 38' and 41' to which are fixed knobs 44' and 45' respectively. Wheels 38' and 41' correspond to wheels 38 and 41 of Fig. 2 and the general construction of the follower is similar to that shown in Fig. 2. It will be seen that if the follower pointer 42 is caused by manipulation of knobs 44' or 45' to stay in alignment with output pointer 25 of the integrator motion, the follower potentiometer 46 of Fig. 2 will produce a voltage corresponding to the position of pointer 25.

To insure greater accuracy, in place of the construction shown in Fig. 1 in which cable 36 is fixed to carriage 12 or pointer 13, a follower motion, such as indicated at 34, may be used to position carriage 12. In this alternative construction a transverse follower track corresponding to track 35 is fixed to the machine frame adjacent the pointer.

Referring now more particularly to Fig. 3 for a description of a system embodying this invention, two integrators 51 and 52 are provided, each of which is an Abakanowicz motion as shown in Fig. 1 at 14. Follower motions 53, 54, 55, and 56, substantially as shown in Fig. 2 are also provided. Input follower 56 is provided with a pointer 98 corresponding to pointer 13 of Fig. 2. Transparent table 30 is shown passing under integrators 51 and 52 and follower motions 53—56. Translucent paper strip 31 is fixed to table 30 and is cut away to show galvanometer 60 under table 30. Means, such as the rack 61 and screw 62, are provided to move table 30 in a longitudinal direction.

The pointer 13' of integrator 52, corresponding to pointer 13 of Fig. 1, is positioned transversely of table 30 by follower motion 55. Pointer 25' of integrator 52 corresponds to pointer 25 of Fig. 1. Follower 54, pointer 13", integrator 51 and pointer 25" is constructed in the same manner as the corresponding parts 55, 13', 52, and 25' respectively.

Follower 53 is similar in construction to the follower shown in Fig. 2. Follower 53 operates a potentiometer 66 which corresponds to potentiometer 46 in Fig. 2 and includes resistor 67 and contactor 68. Potentiometer 66 receives current through potentiometer 70 from power supply 71. Connected in shunt with potentiometer 66 are three resistors 72, 73 and 74. Resistor 73 is connected between resistors 72 and 74, the latter two being ballast resistors and resistor 73 having an adjustable tap 75. It is thus seen that adjustment of potentiometer 70 varies the range of voltage covered by potentiometer 66. The voltage appearing across taps 68 and 75 diminishes toward zero as tap 68 approaches its mid-position and changes polarity as tap 68 goes through its electrical mid-position. Adjustment of the tap 75 on resistor 73 varies this electrical mid-position.

Taps 68 and 75 are connected through reversing switch 78 and connecting double-throw double-pole switch 79, collecting bus 82 to balanced direct current amplifier 83.

Balanced direct current amplifier 83 is connected to wire coil 85 of galvanometer 60. Coil 85 is suspended for rotation in a spring suspension and is mounted between magnet poles 86 and 87. Coil 85 carries a mirror 89 fixed for rotation therewith. Light source 90 produces light which is reflected from mirror 89 and focused by optical system 91 upon paper strip 31 to form light spot 93 thereon. The above mentioned spring suspension, not shown, tends to keep mirror 89 in a neutral position but current flowing from amplifier 83 through coil 85 causes the coil and mirror to rotate in a direction and magnitude depending on the direction and magnitude of the current flow. Rotation of mirror 89 causes spot 93 to move transversely of paper strip 31 under the path of travel of pointer 13'. Follower motions 54, 55 and 56 are constructed in a manner similar to the device shown in Fig. 2. Followers 54 and 56 include potentiometers corresponding to potentiometer 66 of follower 53. These potentiometers are included in networks 95 and 96 which also include power supplies, and resistors corresponding to elements 70—75 of the network associated with follower 53. Follower 55 differs from followers 53, 54 and 56 in that it has no potentiometer or associated electrical network.

It will be seen that in operation of the device shown in Fig. 3, pointer 25' traces a curve which is the integral of the curve traced by pointer 13'. If pointer 13" is maintained in alignment with pointer 25', then the curve traced by pointer 13' is the second derivative of the curve traced by pointer 25". As pointer 65 is made to follow pointer 25", network 94 produces a voltage which is indicative of the position of pointer 65. The center position being represented by zero voltage and either side of the center position being represented by voltage of opposite polarities. The scale, or range, of this voltage is regulated by potentiometer 70 while the center position is regulated by tap 75. The sense in which this voltage is applied to collector bus 82 is determined by reversing switch 78. The voltage may be eliminated entirely from bus 82 by switch 79. The double-pole double-throw switch 79 is arranged to connect the bus on through if unit 94 is disconnected therefrom. Units 94, 95, and 96 may be connected simultaneously to the bus so that their voltages may be added or subtracted before being fed to the balanced direct current amplifier.

The pointer of input follower 56 may be caused by manual control to follow a curve, perhaps empirical, plotted on strip 31. The voltages indicative of the positions of pointer 13" and the pointer of input follower 56 are produced by networks 95 and 96, respectively, and may be added to bus 82 in the sense desired.

The sum of the voltages collected by bus 82 is applied to amplifier 83 and controls the position of light spot 93.

Fig. 4 shows an alternative means for interconnecting some of the elements of the electrical circuit associated with a follower and also shows an additional network to allow the multiplying of two quantities before feeding them to the bus.

In Fig. 4, follower 100 has a construction similar to that shown in Fig. 2. Follower 100 is associated with a potentiometer 101. Potentiometer 101 includes a resistor 102 and a sliding contactor 103 which are connected to a three element jack 105. Potentiometer 101 may be connected to network 104 through jack 105, plug 106, cord 107, plug 108 and jack 109 so that resistor 102 is connected across resistors 111, 112, and 113 which are connected in series, with resistor 112 in the middle. Contactor 103 of potentiometer 101 may be connected through plug jack and cord elements 105—109 and through reversing switch 114 to jack 115. Jack 115 may be connected through plug 116, cord 117 and plug 118 to jack 120 of balanced direct current amplifier 125. In network 104 direct current power supply 123, potentiometer 110, resistors 111—113, and reversing switch 114 correspond to elements 71, 70, 72—74, 78, respectively, of Fig. 3.

Follower motion 100 also controls potentiometer 130 which comprises resistor 131 and contactor 132, adapted to be associated with network 139. Potentiometer 130 may be connected through jack 134, plug 135, cord 136, plug 137 and jack 138 so that resistor 131 is connected across resistors 140, 142 and 143 connected in series, resistor 142 being between resistors 140 and 143. Cord and plug set 135—137 may also operate to connect contactor 132 through reversing switch 145 to jack 147. Contactor 144 adjustable along resistor 142 is also connected through reversing switch 145 to jack 147. The output of balanced direct current amplifier 125 is connected across potentiometer 148. Resistors 140—143 are connected across one end of potentiometer 148 and its adjustable contactor.

Jack 147 may be connected through plug 150, cord 151 and plug 152 to jack 153 of bus 82. Bus 82 is the same as shown in Fig. 3, jack 153 taking the place of switch 79.

The extra potentiometer shown in Fig. 4 may be mounted in the follower wheel corresponding to wheel 39 in Fig. 2. Alternatively the follower motion could be arranged so that any small number of potentiometer units each containing a connecting jack may be slipped on a follower shaft.

The jack and plug arrangement shown in Fig. 4 may be used with all of the potentiometers, such as potentiometer 66, in Fig. 3 and also to connect the electrical network associated with each follower to the bus 82. This arrangement permits of a maximum of flexibility with a minimum of elements, allowing a network such as 139 to be inserted between the usual network 104 and the bus 82 to form a multiplier unit for any follower.

The multiplier unit shown in Fig. 4 is essentially two units such as 95 in Fig. 3 connected in series. The voltage appearing at jack 147 is therefore proportional to the product of the positions of the two potentiometers included in the multiplier circuit. Scale setting is accomplished by adjustment of potentiometer 148.

It is to be understood that while a manually operated type of this device has been described for purposes of simplicity it is contemplated that automatic following could be arranged through the use of well known devices if it were desirable to do so.

As an example of the use of the reflex integraph described above, the steps will be outlined in the solution of the differential equation $$\frac{d^2y}{dx^2} + \frac{1}{2}y = 0 \qquad (1)$$

which is to be solved subject to the conditions:

$$\left.\begin{array}{l} y=1 \text{ when } x=0 \\ \frac{dy}{dx}=0 \text{ when } x=0 \end{array}\right\} \qquad (2)$$

To prepare the equation for solution by the integraph, it is solved for its highest ordered derivative. Thus:

$$\frac{d^2y}{dx^2} = -\frac{1}{2}y \qquad (3)$$

The second derivative is assigned to follower 55 (in Fig. 3). Since each of the integrator motions 52 and 51 makes an integration, the middle follower 54 will trace out $$\frac{dy}{dx}$$

and the left-hand follower will trace out $y$. The integrator motions 52 and 51 would perform these integrations for any curve traced out by follower 55 and it will be necessary to impose the conditions represented by Equation 3 if the curve traced by pointers 25''—65 is to be a solution of Equation 1. To accomplish this the $y$ follower 53 is connected to the bus through switch 79 while reversing switch 78 is placed in its "minus" position. Switches 79' and 79'' associated respectively with followers 54 and 56 are placed in their lower or "out" position so that only the network associated with follower 53 is connected to the bus 82 and to amplifier 83. The light spot will now follow the motion of the $y$ follower and since it appears under the pointer 13' of follower 55, the required relation between $y$ and the second derivative can be maintained by keeping the pointer and the spot in coincidence. This is done by manually operating follower 55 in the arrangement shown in Fig. 3 or may be done automatically.

It is now necessary to decide on some scales. These cannot all be chosen arbitrarily since they are not all independent. One of the scales $$y, \frac{dy}{dx}, \text{ or } \frac{d^2y}{dx^2}$$

which are measured normal to the $x$ axis, may be assigned a trial value as may the $x$ scale which is measured along the axis. The following trial scale values are now arbitrarily assigned.

$y$, 1 inch to .25
$x$, 1 inch to .20

If the distance from the fixed pivot 16 to track 11 as seen in Fig. 1 is 5 inches, and if the middle follower 13'' of Fig. 3 is displaced 1 inch and table 30 is moved 5 inches, the pointer 25'' of integrator 51 will travel 1 inch away from the $x$ axis. The scale assigned for $$\frac{dy}{dx}$$

must make the area swept out by pointer 13'' consistent with the travel along the $y$ axis. The increment on the $y$ scale is equal to the travel along the $y$ axis multiplied by the $y$ scale value. The area swept out by pointer 13'' is equal to the product of the $$\frac{dy}{dx}$$

scale value, the $x$ scale value, and the number of square inches swept out.

If the $x$, $y$, $\dfrac{dy}{dx}$, and $\dfrac{d^2y}{dx^2}$ scale values are represented by $S_x$, $S_0$, $S_1$, and $S_2$, respectively, and since similar statements apply to both integrators 51 and 52, the following is true:

$$\left.\begin{array}{l}S_0 = S_x S_1 \cdot 5 \\ S_1 = S_x S_2 \cdot 5\end{array}\right\} \quad (4)$$

By algebraic process the following values are obtained since $S_0 = 0.25$ and $S_x = .20$ $$S_1 = \frac{S_0}{5 \cdot S_x} = \frac{.25}{(5)(0.2)} = 0.25$$

$$S_2 = \frac{S_1}{5 \cdot S_x} = \frac{.25}{(5)(0.2)} = 0.25$$

Reference to Equation 3 shows that with these scales, the spot 93 should be moved half as much as the $y$ follower pointer 65. This relation can be obtained by arbitrarily displacing pointer 65 from the $x$ axis by 4 inches. The spot is then moved 2 inches from the $x$ axis by adjusting the potentiometer 70. The machine is thus calibrated and set up in the same operation.

It remains to impose upon the integraph the initial conditions expressed by the relations set forth in Equation 2. Table 30 is moved to its extreme right position. The $y$ pointers 65 and 25'' are moved to scale position 1.00 and $$\frac{dy}{dx}$$

pointers 13'' and 25' are moved to scale position 0. The sharp wheels (corresponding to wheel 24 of Fig. 1) of integrators 51 and 52 are brought to rest on the paper 31.

$$\frac{d^2y}{dx^2}$$

pointer 13' of integrator 52 is registered with spot 93 and the machine is ready to run.

In a manually operated integraph, such as is shown in Fig. 3, three operators are required. The first operator keeps pointer 13' in coincidence with spot 93 by manipulating the knobs of follower 55. The second operator keeps pointer 13'' in alignment with pointer 25' by manipulation of the knobs of follower 54. The third operator keeps pointer 65 in alignment with pointer 25'' by manipulation of the knobs of follower 53. The pencils, attached to the pointers 13', 13'', and 65 of Figure 3, trace out the solution and its first two derivatives on the paper attached to the moving table during the run. In this application, the input follower 56 is not used.

To explain the use of the integraph in an iteration procedure, an outline will be given of the method of computing the maximum water level in a reservoir when a flood comes into it. The reservoir is usually provided with a spillway whose rate of discharge depends on the depth of water in the reservoir. The surface area of the reservoir also varies with its water depth in a manner determined by the topography of the site.

The rate at which the reservoir rises is expressed by the following equation:

$$\frac{dy}{dt} = \frac{Q-q}{A} \quad (5)$$

where $y$, represents the elevation of the reservoir water surface (feet),
$t$, time (seconds),
$Q$, the flood inflow (ft.$^3$/sec.),
$q$, the spillway discharge (ft.$^3$/sec.),
$A$, the area of the reservoir water surface (ft.)$^2$.

Figure 6:
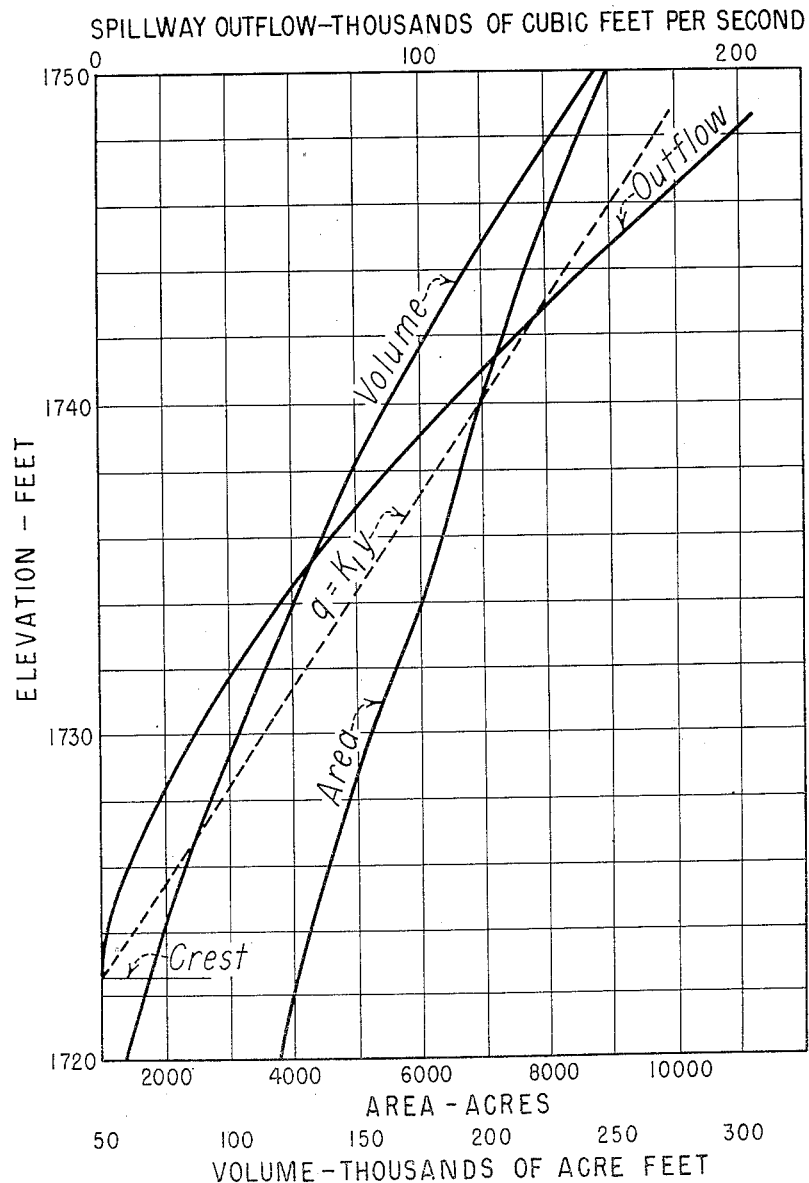

The data for any actual case are usually presented in the form of curves, such as those shown on Figures 6 and 7. A scrutiny of these graphs will show that $q$ is not proportional to $y$ and that $A$ varies with $y$. Considered as a differential equation, therefore, Equation 5 is "non-linear" in type because the dependent variable appears in some manner other than to the first power. Equations of this type are very difficult to treat by formal methods and the usual procedure is to obtain an approximation by arithmetic means.

In proceeding with the solution by use of the reflex integraph, a linear approximation is written for the discharge as follows:

$$q = K_1 y$$

where $K_1$ is some constant.

The area $A$ is assumed to be constant at some average value $A_0$. Then the following equation is approximately true:

$$\frac{dy}{dt} = \frac{Q - K_1 y}{A_0} \quad (6)$$

This form of discharge curve $q = K_1 y$ gives an approximation of the type shown by the dotted line in Fig. 6 and makes it necessary to measure $y$ from the spillway crest level. Equation 6, being of the linear type, can be readily set up and solved on the integraph.

The curve $$\frac{Q}{A_0}$$

is plotted from the flood-inflow curve in Fig. 7 and from the assumed value of $A_0$, and is plotted on paper 31 to be followed by the pointer 98 of input follower 56. Pointer 13' of integrator 52 traces $$\frac{dy}{dx}$$

and pointer 25' traces $y$. The electrical outputs of $y$ follower 54 and input follower 56 are both connected to bus 82 in such a maner as to impose the relation expressed by Equation 6. Integrator 51 and follower 53 are not used in this solution.

Table 30 is now moved while input pointer 98 follows curve $Q/A_0$ as plotted on paper 31 and while pointer 13' follows light spot 93. $y$ is then traced on paper 31 by the pencil carried by pointer 25'. This first approximation of $y$ is shown as the dotted curve in Fig. 7.

This first approximation is used to obtain a closer approximation by the procedure of adding the term $$\frac{K_1 y}{A_0}$$

to both sides of Equation 5 to obtain the following:

$$\frac{dy}{dt} + \frac{K_1 y}{A_0} = \frac{Q-q}{A} + \frac{K_1 y}{A_0} \quad (7)$$

If Equation 7 is compared with Equation 6 written in the form $$\frac{dy}{dt}+\frac{K_1 y}{A_0}=\frac{Q}{A_0} \qquad (6)$$

it will be seen that the right-hand member $$\frac{Q}{A_0}$$

has been replaced by $$\frac{Q}{A}$$

plus a correction term $$\left(\frac{K_1 y}{A_0}-\frac{q}{A}\right)$$

which accounts for the difference in discharge as given in Fig. 6 between the solid curve for outflow and the dotted linear approximation, and also that the actual area A is used rather than the average area $A_0$.

If the quantity $$\frac{Q-q}{A}+\frac{K_1 y}{A}$$

is computed on a basis of said first approximation and substituted for the $$\frac{Q}{A}$$

curve previously followed by the input follower 56, Equation 7 may be solved in the manner previously described for Equation 6 to obtain a second approximation. In a similar manner the second approximation may be used to obtain a third approximation and the third may be used to obtain a fourth. In this case it will be found that the fourth approximation agrees with the third. This means that the fourth approximation, in fact, satisfies the non-linear Equation 5; since the identical terms which were added to both sides of it to obtain Equation 7 did not change the equality, and therefore, the solution for Equation 7 will also satisfy Equation 5. In this manner a non-linear equation has been solved by the use of a machine arranged for the solution of linear equations.

It may be noted that the approximations which were introduced as temporary expedients have now all been eliminated. The final curve is shown on Figure 7 labelled "Reservoir level."

In the cases where the procedure applies, it may be outlined as follows:

(a) Write the nonlinear equation.
(b) Write a linear approximation representing the true conditions as closely as possible, and solve it by use of the integraph.
(c) Add the linear terms containing the dependent variable to both sides of the nonlinear equation and group the terms so as to make it possible to solve the new equation as a linear equation when the nonlinear terms have been computed on the basis of the first approximation.
(d) Solve the new equation on the integraph to obtain a second approximation.
(e) Use the second approximation to get a third, and repeat until there is no further change.
(f) The stable solution is the "desired" solution of the non-linear equation.

A case which will illustrate the use of the multiplier circuit is the following. An important equation in the theory of surge tanks is of the form $$\frac{dy^2}{dx^2}-\frac{1}{2}\left(\frac{dy}{dx}\right)^2+y=0 \qquad (8)$$

This equation is nonlinear because the square of the first derivative appears and it is difficult to treat by formal methods. The machine is adapted for solving this equation by replacing the idler pulley corresponding to wheel 39 of Fig. 2, on follower 54 with a rheostat pulley, corresponding to wheel 40 of Fig. 2. Follower 54, which traces out $$\frac{dy}{dx}$$

in this case, therefore controls two sliders. This makes the output of the multiplier circuit proportional to $$\left(\frac{dy}{dx}\right)^2$$

This case is set up on the machine in the manner described for Equation 1 except that the output of the multiplier circuit is fed to the bus in addition to the output from the y follower. This case illustrates the use of the machine to solve a non-linear differential equation directly.

The use of a machine of this type for solving a system of equations directly may be illustrated as follows: Suppose it is desired to solve a system of equations such as:

$$\frac{dz}{dx}-2y=0$$
$$\frac{d^2 y}{dx^2}+\frac{dz}{dx}-y=0 \qquad (9)$$

Subject to the conditions: $z=0$, $y=1$, and $$\frac{dy}{dx}=0$$

when $x=0$.

Figure 5:
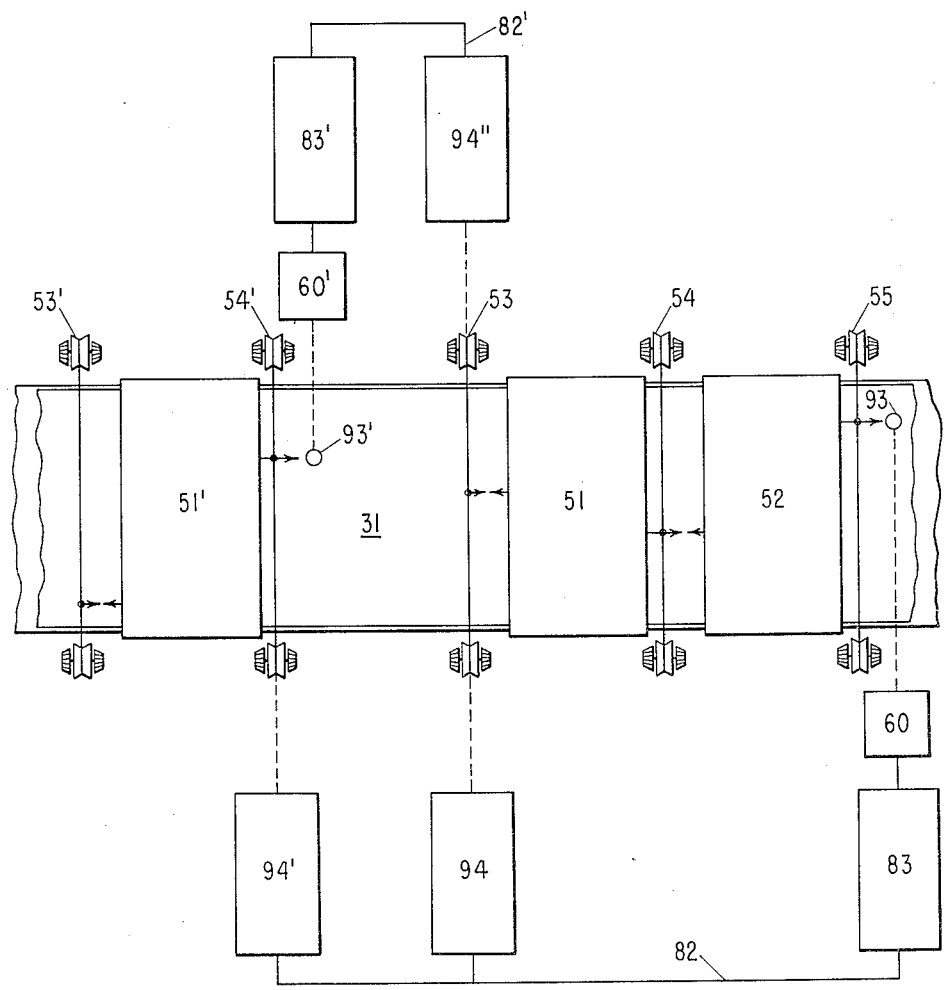
Fig. 5 is a schematic view of an alternate system which may be used with this invention.

For this purpose three integrators 51, 52 and 51' and a duplicate bus system 82' are required as shown in Fig. 5. Integrators 51', 51 and 52 are the same as integrators 51 and 52 in Fig. 3. Followers 53, 54 and 55 are the same as the followers of the same number in Fig. 3 while followers 53' and 54' are the same as followers 53 and 54, respectively. Networks 94 and 94' are the same as network 94 shown in Fig. 3. Amplifier 83 and galvanometer 60 are the same as the elements of the same number in Fig. 3. Amplifier 83' and galvanometer 60' are the same as amplifier 83 and galvanometer 60, respectively. Light spots 93 and 93' are identical with light spot 93 in Fig. 3. Buses 82 and 82' are constructed and connected to the other elements as is bus 82 in Fig. 3.

In Fig. 5 the y integration could be performed by integrators 51 and 52 and the z integration by integrator 51'. The indicator light spots 93 and 93' would then be arranged to appear at the input sides of integrators 52 and 51', respectively. A solution of Equation 9 for the highest order derivative in each case gives:

$$\frac{dz}{dx}=2y$$
$$\frac{d^2 y}{dx^2}=-\frac{dz}{dx}+y \qquad (10)$$

If the two buses 82 and 82' are now arranged so that 82' imposes the $2y$ magnitude on the input of integrator 51' and the other imposes the $$-\frac{dz}{dx}+y$$

magnitude on the input of integrator 52, the machine will draw out the curves for $$y, \frac{dy}{dx}, \frac{d^2y}{dx^2}, z, \text{ and } \frac{dz}{dx}$$

by followers 53, 54, 55, 53' and 54', respectively, providing the indices are set to the above-mentioned values of $z$, $y$, and $$\frac{dy}{dx}$$

at the start of the run. This example illustrates the use of a machine of this type for solving parametric differential equations directly.

It will be seen that this invention provides a reflex integraph simple of manufacture, free of lost motion, convenient to use, highly flexible and adaptable to the solution of a number of types of mathematical problems. The embodiments shown herein are exemplary only and many modifications will occur to those skilled in the art without departing from the spirit of the invention as defined in the appended claims.

What is claimed is:

1. Flexible integrating apparatus comprising a table, a plurality of seriately related integrating devices each having an input pointer and an output pointer arranged to travel transversely of said table, driven means controlling the position of said input pointers, whereby the input pointer of each succeeding integrating device may be caused to follow the output pointer of each preceding integrating device, each integrating device being arranged so that its output pointer indicates the integral of the indication of its input pointer, means for producing relative longitudinal movement between said table and said integrating devices, an indicator controlling means adapted to move said indicator transversely of said table in juxtaposition to the input means of one of said integrating devices, and means selectively responsive to a function of the output traverse of at least one of said integrating devices for controlling the movement of said indicator.

2. Flexible integrating apparatus according to claim 1, at least one of said driven means controlling a variable impedance in accordance with the position of the input pointer controlled by said last mentioned driven means, said indicator controlling means comprising an electrical circuit selectively connectable to include said variable impedance and to control the movement of said indicator in accordance with a function of the position of said last mentioned input pointer.

3. Flexible integrating apparatus according to claim 1, at least one of said driven means is manually adjustable to align its input pointer with the preceding output pointer, said last mentioned driven means controlling a variable impedance in accordance with the position of its input pointer, said indicator controlling means comprising an electrical circuit selectively connectable to include said variable impedance and to control the movement of said indicator in accordance with a function of the position of said last mentioned input pointer.

4. Flexible integrating apparatus according to claim 1, in which said table is light pervious and in which said indicator comprises a light beam projected through said table.

5. Flexible integrating apparatus comprising a table, a plurality of seriately related integrating devices each having an input pointer and an output pointer arranged to travel transversely of said table, each integrating device being arranged so that its output pointer indicates the integral of the indication of its input pointer, driven means controlling the position of the input pointer whereby the input pointer of each succeeding integrating device may be caused to follow the output pointer of each preceding integrating device, at least one independent input device having a pointer arranged to travel transversely of said table, driven means for adjusting the transverse position of said last mentioned pointer, means for producing relative longitudinal movement between said table and said devices, an indicator, control means adapted to move said indicator transversely of said table in juxtaposition to the input end of one of said integrating devices, said indicator control means being simultaneously responsive to a function of the traverse of said independent input device and to the output traverse of at least one of the said output means for controlling the traverse of said indicator.

6. Flexible integrating apparatus according to claim 5, at least one of said driven means controlling a variable impedance in accordance with the position of the pointer adjusted by said last mentioned driven means, said indicator controlling means comprising an electrical circuit selectively connectable to include said variable impedance and to control said indicator in accordance with functions of the traverses of said last mentioned driven means and said input device.

7. In an apparatus for solving mathematical equations, a table, means for moving said table longitudinally, a plurality of integrating devices each having an input pointer and an output pointer, said pointers being constrained to move in directions transverse to the direction of said table motion, each integrating device controlling its output pointer to trace the integral of a curve traced by its input pointer, said integrating means being arranged so that the input pointer of a succeeding integrating means may be caused to follow the output pointer of a preceding integrating means, indicating means, control means causing said indicating means to move transversely to the motion of said table adjacent the input pointer of one of said integrating devices, means for causing said last mentioned input pointer to follow the movements of said indicator, a means associated with each output pointer for producing a measure indicative of the position of said pointer, collecting means for applying selected ones of said measures to control the position of said indicating means.

8. The combination of claim 7, including an independent input device having a pointer, means adapted to cause said last mentioned pointer to move transversely of said table, means adapted to produce a measure of the position of said input device, said collecting means being adapted to apply said last measure selectively to control the position of said indicating means.

9. The combination of claim 7, in which each of the means for producing a measure of position of the output pointers includes a carriage, means adapted to move said carriage transversely of said table, said moving means including an impedance adjusted in accordance with the position of said carriage.

10. The combination of claim 7, in which the table is light pervious and in which the indicator comprises a light beam projected through said table and focused to form a spot substantially in the plane of said table.

11. The combination of claim 7, in which the integrating devices are Abakanowicz motions.

12. The combination of claim 7, in which the means for producing a measure of the position of said output pointers also includes means for adjusting the range of magnitude of said measure, and means for adjusting the center of said range to a predetermined point.

13. The combination of claim 7, in which the measure of the position of at least one of said pointers is a first voltage, means producing a second voltage equal to said first voltage multiplied by a factor, said factor being a function of the position of one of said pointers.

14. In an apparatus for solving mathematical equations, a table, means for moving said table longitudinally, a plurality of integrating devices each having an input pointer and an output pointer, said pointers being arranged to move transversely to the direction of motion of said table, each integrating device controlling its output pointer to trace the integral of a curve traced by its input pointer, said integrating means being arranged so that the input pointer of a succeeding integrating means may be caused to follow the output pointer of a preceding integrating means, indicating means, control means causing said indicating means to move transversely to the direction of motion of said table adjacent the input pointer of one of said indicating devices, means for causing said last mentioned input pointer to follow the movements of said indicator, a means associated with each output pointer for producing a measure indicative of the position of said pointer, collecting means for applying selected ones of said measures to said control means to control the position of said indicating means, each of the means for producing a measure of position of the output pointers including a carriage, means adapted to move said carriage transversely of said table, said moving means arranged to vary an impedance in accordance with the position of said carriage.

15. The combination of claim 14, including selectively operable means for inverting the measure of the position of said output pointer before application thereof to the collecting means.

16. In apparatus for solving mathematical equations, a table, at least one integrating device having an input pointer and an output pointer, means for causing relative longitudinal motion between said integrating device and said table, said output pointer being controlled by said integrating device to trace the integral of a curve traced by said input pointer, indicating means adapted to move transversely of the direction of said relative longitudinal motion and table adjacent said input pointer, means for causing said input pointer to follow the movements of said indicator, means manually alignable with said output pointer for causing said indicating device to move transversely in accordance with a function of the position of said output pointer.

17. In a device for solving mathematical equations, a plurality of integrating devices each having input means and output means arranged to travel in predetermined paths, the output means being controlled to indicate the integral of the indication of the input means, the path of the output means of at least one of said integrating devices being in juxtaposition to the path of the input means of at least one other integrating device, an indicator, control means to cause said indicator to move in juxtaposition to the path of the input means of one of said integrating devices, an independent input device arranged to travel along a predetermined path, a series electrical circuit for collecting functions of the traverse of said independent input device and at least one of said integral output means in the form of electric potentials, said series electrical circuit being also for totaling said functions each in the proper electrical sense, said series electrical circuit being arranged to control the traverse of said indicator.

18. In an apparatus for solving mathematical equations, a table, means for moving said table longitudinally, a plurality of integrating devices each having an input pointer and an output pointer, means adapted to cause said pointers to move transversely to the longitudinal motion of said table, each integrating device controlling its output pointer to trace the integral of a curve traced by its input pointer, said integrating means being arranged so that the input pointer of a succeeding integrating means may be caused to follow the output pointer of a preceding integrating means, indicating means, control means for causing said indicating means to move transversely of said table adjacent the input pointer of one of said indicating devices, means for causing said last mentioned input pointer to follow the movements of said indicator, a means associated with each output pointer for producing a measure indicative of the position of said pointer, collecting means for applying selected ones of said measures to control the position of said indicating means, each of the means for producing a measure of position of the output pointers including a carriage alignable with an adjacent integrator output pointer, means adapted to move said carriage transversely to the motion of said table, said moving means controlling means for varying an impedance in accordance with the position of said carriage, said moving means including the use of a taut cable-like means for transmitting the motion of said carriage to said impedance without the introduction of errors due to sensible mechanical play or lost motion.

19. In apparatus for solving equations, a table, a plurality of integrating devices each having an input pointer and an output pointer arranged to travel transversely of said table, each of said devices controlling its output pointer to indicate the integral of the indication of its input pointer, said integrating devices being arranged so that the input pointer of each succeeding integrating device may be caused to follow the output pointer of each preceding integrating device, means for producing relative longitudinal movement between said table and said integrating devices, said longitudinal movement being in a direction substantially at right angles to said transverse direction, a plurality of indicators, means for causing each of said indicators to move transversely of said table in juxtaposition to the input means of one of said integrating devices, a plurality of collecting means each selectively responsive to a function of the output traverse of at least one of said integrating devices for controlling the traverses of said indicators.

20. In an apparatus for solving mathematical equations, a table, means for moving said table longitudinally, a plurality of integrating devices each having an input pointer and an output pointer, means adapted to cause said pointers to move transversely of said table, each integrating device controlling its output pointer to trace the integral of a curve traced by its input pointer, said integrating means being arranged so that the input pointer of a succeeding integrating means may be caused to follow the output pointer of a preceding integrating means, indicating means, means for causing said indicating means to move transversely of said table adjacent the input pointer of one of said indicating devices, means for causing said last mentioned input pointer to follow the movements of said indicator, a means associated with each output pointer for producing a measure indicative of the position of said pointer, collecting means for applying selected ones of said measures to control the position of said indicating means, each of the means for producing a measure of position of the output pointers including a carriage, means adapted to move said carriage transversely of said table, said moving means including an impedance adjusted by the position of said carriage, said collecting means being a series electrical circuit for totaling said measures electrically in the proper electrical sense.

21. The combination of claim 20, in which the indicator means is a light spot, in which the control means for moving the light spot is a mirror galvanometer swinging a beam of light focused in the plane of the table to form said light spot, and in which said series electrical circuit controls said mirror galvanometer, said series electrical circuit being provided with disconnection switches each having two positions, each of said switches in one of said positions including one of said impedances in said series circuit and in the other position continuing said series circuit while excluding said last mentioned impedance from the series circuit.

ROBERT E. GLOVER.

REFERENCES CITED

The following references are of record in the file of this patent:

UNITED STATES PATENTS

| Number | Name | Date |
| --- | --- | --- |
| 2,113,436 | Williams | Apr. 5, 1938 |
| 2,212,799 | Sperry | Aug. 27, 1940 |
| 2,444,770 | Flyer | July 6, 1948 |

OTHER REFERENCES

"A small scale differential analyser—its construction and operation," by H. S. W. Massey, J. Wylie, R. A. Buckingham and R. Sullivan; "Proceedings of the Royal Irish Academy," vol XIV, sec. A, pages 1–18 and plates I–V; published Oct. 4, 1938.

"An all electric integrator for solving differential equations," by Robert N. Varney; "Review of Scientific Instruments," Jan. 1942, vol. 13, No. 1; pages 10–16 inclusive.

"The Theory of Mathematical Machines," by Francis J. Murray; revised edition; Kings' Crown Press, N. Y., 1948; pages IV–7 to IV–10.